United States Patent
Kim

(10) Patent No.: US 6,646,965 B1
(45) Date of Patent: Nov. 11, 2003

(54) METHOD AND APPARATUS FOR ESTABLISHING MANUFACTURING-SPECIFIC TEST WRITING PARAMETERS FOR WRITING OF WRITABLE OPTICAL STORAGE MEDIA

(75) Inventor: Jeong Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/397,028

(22) Filed: Sep. 16, 1999

(30) Foreign Application Priority Data

Sep. 18, 1998 (KR) .............................. 98-39128

(51) Int. Cl.[7] ................................. G11B 7/00
(52) U.S. Cl. ................. 369/47.53; 369/47.5; 369/53.1; 369/59.1; 369/116
(58) Field of Search ................. 369/116, 47.5, 369/47.53, 275.3, 47.55, 53.1, 53.11, 47.1, 59.1, 59.11

(56) References Cited

U.S. PATENT DOCUMENTS

| | | | | | |
|---|---|---|---|---|---|
| 5,502,702 | A | * | 3/1996 | Nakajo | 369/116 |
| 5,978,351 | A | * | 11/1999 | Spruit et al. | 369/116 |
| 6,052,347 | A | * | 4/2000 | Miyata | 369/116 |
| 6,111,841 | A | * | 8/2000 | Iida et al. | 369/116 |
| 6,157,609 | A | * | 12/2000 | Shoji et al. | 369/116 |

FOREIGN PATENT DOCUMENTS

JP         5-290383      * 11/1993     ............... 369/116

* cited by examiner

*Primary Examiner*—Muhammad Edun
(74) *Attorney, Agent, or Firm*—Birch, Stewart, Kolasch & Birch, LLP

(57) ABSTRACT

A method and an apparatus establish manufacturer-specific test writing parameters for writing of a writable optical storage media in accordance with the media manufacturers, which are experimentally determined and stored into a certain storing unit; determine an optimum writing light power based on the determined optimum writing parameters; and write an input signal into the user's data region of the optical disk.

12 Claims, 7 Drawing Sheets

| W1,W2,W3 | =000 | --→ | $P_{ind}$ =5mw |
|---|---|---|---|
|  | =001 | --→ | $P_{ind}$ =6mw |
|  | =010 | --→ | $P_{ind}$ =7mw |
|  | =011 | --→ | $P_{ind}$ =8mw |
|  | =100 | --→ | $P_{ind}$ =9mw |
|  | =101 | --→ | $P_{ind}$ =10mw |
|  | =110 | --→ | $P_{ind}$ =11mw |
|  | =111 | --→ | $P_{ind}$ =12mw |

EXAMPLE1. : M1M2...M8  S1S2...S8  F1F2..F8 = 10010111  01001001  00000000
= 97 : 49 : 00

EXAMPLE2. : M1M2...M8  S1S2...S8  F1F2..F8 = 01110000  01000101  00010101
= 70 : 45 : 15

METHOD AND APPARATUS FOR ESTABLISHING MANUFACTURING-SPECIFIC TEST WRITING PARAMETERS FOR WRITING OF WRITABLE OPTICAL STORAGE MEDIA

BACKGROUND OF THE INVENTION

1. Field of the Invention

The present invention relates to a recording/reproducing apparatus for a writable optical storage medium, and in particular to the optimization of writing parameters (for example, a writing light power, writing beam profile (or, writing strategy)) for writing of a writable optical storage medium, based on experimentally determined optimum test writing parameter for the writable optical storage medium according to the manufacturer thereof, by associating data indicative of the manufacturer of a writable optical storage medium and optimum test writing parameters corresponding to the medium manufacturer, and prior to writing an input signal into a writable optical storage medium, judging the medium manufacturer corresponding to a writable optical storage medium, setting the optimum test writing parameters corresponding thereto, and accordingly determining optimum writing parameters for the medium based by performing an optimization produce employing the thusly set optimum test writing parameters.

2. Description of the Background Art

FIG. 1 illustrates the construction of a conventional writable optical storage medium recording/reproducing apparatus which includes an A/D converter 20 converting an inputted analog signal into a digital signal, a MPEG encoder 30 encoding the digital signal from the A/D converter 20 into a MPEG format signal, a digital writing signal processing unit 70a converting the encoded signal into a writable format by adding an error correction code (ECC), channel bit encoder 80 for converting the signal converted into a writable format into a bit stream, a TC (Laser Diode) driving unit 81 receiving the signal from the channel bit encoder 80 and outputting an optical content driving signal, a pick-up unit 11 writing the input signal into the writable optical storage medium 10 or detecting the written signal in accordance with the optical content driving signal, a drive unit 90 driving the pick-up unit 11 and a spindle motor 91, an R/F unit 100 receiving a signal detected by the pick-up unit 11 and a spindle motor 91, an R/F unit 100 receiving a signal detected by the pick-up unit 11 and outputting a filtered and shaped signal, a servo unit 110 controlling the driving operation of the drive unit 90 based on a tracking error signal TE of the pick-up unit 11, a focus error signal FE, and a rotation of the writable optical storage medium 10 and detecting a synchronous state of the output signal from the R/F unit 100, a digital reproducing signal processing unit 70b recovering a compression write data from the filtered and shaped signal based on the detected synchronous signal, an MPEG decoder 120 decoding the compressed data, converting it into a video and audio signal and outputting the same, and a microcomputer 60 controlling the operations of the recording/reproducing apparatus.

The operation of the writable optical storage medium recording/reproducing apparatus will be explained with reference to the accompanying drawings.

First, when a signal KEYSIG is inputted into the microcomputer 60 requesting a writing operation of an inputted signal INPUT applied to the input terminal, the microcomputer 60 controls the pick-up unit 11 via the servo unit 110 and the drive unit 90 so that a writing light power value $P_{ind}$ written on the writable optical storage medium 10 is read-out before the input signal INPUT is written into the writable optical storage medium. In the case that the writable optical storage medium 10 is a rewritable medium such as a compact disc rewritable (CD-RW), as shown in FIG. 2, the writing light power value $P_{ind}$ is written in a data form of 3 bits W1, W2 and W3 at a M1 information byte of a special information field in an Absolute Time In Pre-Groove (ATIP) signal format of a lead-in region of the writable optical storage medium 10.

When the light power value $P_{ind}$ is read out from the data W1, W2 and W3, the microcomputer 60 outputs test digital data (for example, 101010 . . . ) to the channel bit encoder 80 via the digital writing signal processing unit 70a, and the channel bit encoder 80 converts the digital bit stream outputted from the digital writing signal processing unit 70a into a signal format for writing into the writable optical storage medium 10 and then applies the converted signals to the LD driving unit 81.

As shown in FIG. 3, the microcomputer 60 variably applies an adjusting signal to the LD driving unit 81 so that the magnitude of the light power value is changed in a certain range of $P_{ref+a}$, $P_{ref-a}$ based on a reference writing light power (for example, $P_{ref}$=8 mW) generated by the writing light power value $P_{ind}$. The LD driving unit 81 outputs a test digital data based on the optical driving current corresponding to the adjusting signal, and the pick-up unit 11 writes the test digital data into the test writing region of the writable optical storage medium 10. Here, in the case that the loaded writable optical storage medium 10 is a rewritable medium such as a CD-RW, as shown in FIG. 4A, the test writing region is formed in the PCA (Power Calibration Area). In particular, as shown in FIG. 4B, the microcomputer 60 causes the test digital data to be written into the test writing region of the rewritable optical storage medium and writes a certain information into the count region B of the PCA region so that the written number of the test digital data is recognized by controlling the pick-up unit 11.

As the LD driving current is gradually varied, in a state that the test digital data is written in the test region A and the written number of data in the region A is written in the count region B of the PCA of the writable optical storage medium 10, the microcomputer 60 controls the pick-up unit 11, and the pick-up unit 11 reads out the test data written in the test region of the PCA region. The microcomputer 60 causes the R/F unit 100 to filter and shape the reproduced signal read-out by the pick-up unit 11 and continuously detects the jitter amount of the clock signal which is phase-synchronized to the reproducing signal by the servo unit 110. The microcomputer 60 detects an optimum writing light power(in FIG. 3, $P_{op}$) by which the test digital data is written at the time when the minimum jitter amount is detected from the clock signals.

When the optimum writing light power $P_{op}$ is determined, an analog signal such as an externally inputted video or audio signal is inputted into the A/D converter 20 for a writing operation at the writable optical storage medium 10. In this state, the A/D converter 20 converts the inputted signal into a digital signal, and the MPEG encoder 30 encodes the digital signal based on the MPEG method. The digital writing signal processing unit 70a generates an error correction code (ECC) block by adding an encoding and error correction parity to the encoded signal in order to enhance reliability when writing the encoded signal into a writable optical storage medium 10 and output the generated code to the channel bit encoder 80. The channel bit encoder 80 converts the digital bit stream data outputted from the digital writing signal processing unit 70a into a pulse width-modulated signal format for being written into a writable optical storage medium 10.

Therefore, the microcomputer 60 controls the LD driving unit 81 using an optimum light driving current so that the pulse width-modulated signal is written into the writable optical storage medium 10 based on the optimum writing light power detected during the above-described operation. The LD driving unit 81 applies the pulse width-modulated signal to the pick-up unit 11 based on the optimum light driving current, and the pulse width-modulated signal is written in a user's data recording region of the writable optical storage medium 10.

However, in the case that an optimum writing light power is detected, and an input signal is written, a certain light power deviation occurs between the writable optical storage medium fabrication apparatus and the recording/reproducing apparatus, which writes an input signal into the writable optical storage medium and reproduces the signal therefrom, due to a circuit characteristic and a writable optical storage medium characteristic in the system. For example, a certain deviation may occur between a reference light power adapted to the writable optical storage medium in view of the writable optical storage medium fabrication apparatus and the reference light power for determining a writing light power of the writable optical storage medium in view of each recording/reproducing apparatus. The reference light power adapted under the optimum writing condition when fabricating the writable optical storage medium may not correspond to the reference light power which provides the optimum writing conditions for the recording/reproducing apparatus due to the above-described deviation. The optimum writing condition measured when fabricating a certain writable medium may be, for example, a reference light power value of 5 mW. However, in view of the recording/reproducing apparatus, the optimum writing condition with respect to the above-described medium may be a light power value of 11 mW. In this case, even when performing the optimum writing optical detection process by varying the light power value based on the reference light power value of 5 mW, since the steps (for example, 15 steps of increments 0.3 mW) for varying the light power value is limited, in view of the recording/reproducing apparatus, it is impossible to reach 11 mW which is the optimum writing condition of the writable optical storage medium.

Therefore, when fabricating the writable optical storage medium, even when the optimum optical writing power detection process is performed based on the reference light power set during a writable optical storage medium manufacturer, the recording/reproducing apparatus does not detect the optimum writing light power.

SUMMARY OF THE INVENTION

Accordingly, it is an object of the present invention to provide an optimum optical writing condition detection and storing method and an optical writing apparatus using the same which are capable of judging an optimum optical writing condition of an writable optical storage medium by the manufacturer thereof, storing the optimum condition into a certain storing unit based on the manufacturer of the writable optical storage medium, judging the manufacturer of the writable optical storage medium when writing an input signal into a certain writable optical storage medium, reading an optimum writing condition corresponding to the manufacturer from the storing unit, detecting an optimum writing light power based on the read-out optimum writing condition and writing an input signal based on the optimum writing light power.

It is another object of the present invention to provide an optimum writing condition detection and storing method and a writing method using the same which are capable of judging an optimum writing condition by the manufacturing company of an writable optical storage medium manufacturer, storing an optimum condition into a certain storing unit based on the manufacturer of the writable optical storage medium, judging the manufacturer of the writable optical storage medium when writing an input signal into a certain writable optical storage medium, reading an optimum writing condition corresponding to the manufacturer from the storing unit and detecting an optimum writing light power based on the read-out optimum writing condition.

To achieve the above objects, there is provided an optimum writing condition detection and storing method for a writable optical storage medium according to the present invention which includes a first step for changing an energy content of a writing beam at a certain writable optical storage medium which is different depending on the manufacturer of the same and writing a certain data into a certain region of the writable optical storage medium, a second step for reproducing the written data and detecting an optimum light energy content by the manufacturer based on the characteristic of the reproducing signal, and a third step for storing the optimum writing optical energy content based on a certain data of each manufacturer as the optimum writing optical energy content is detected in the second step.

To achieve the above objects, there is provided a writing light power adjusting apparatus for an writable optical storage medium according to the present invention which includes a storing unit for storing an optimum writing optical energy content based on the manufacturer of the writable optical storage medium with respect to a certain writable optical storage medium, a judging unit for judging the manufacturer of the writing medium, a writing unit for writing an input signal into the writable optical storage medium, and a writing unit for reading the optical writing optical energy content corresponding to the judged manufacturer from the optimum writing optical energy content and writing an input signal using the writing unit based on the optimum writing optical energy content.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A and 8B are views respectively illustrating a lead-in and a lead-out start time data written on a writable optical storage medium.

DETAILED DESCRIPTION OF THE PREFERRED EMBODIMENTS

An optimum writing condition detecting and storing method for a writable optical storage medium in accordance with the manufacturer thereof and an optimum writing light power detection adjusting apparatus using the optimum writing condition according to a preferred embodiment of the present invention will be explained.

Figure 1:
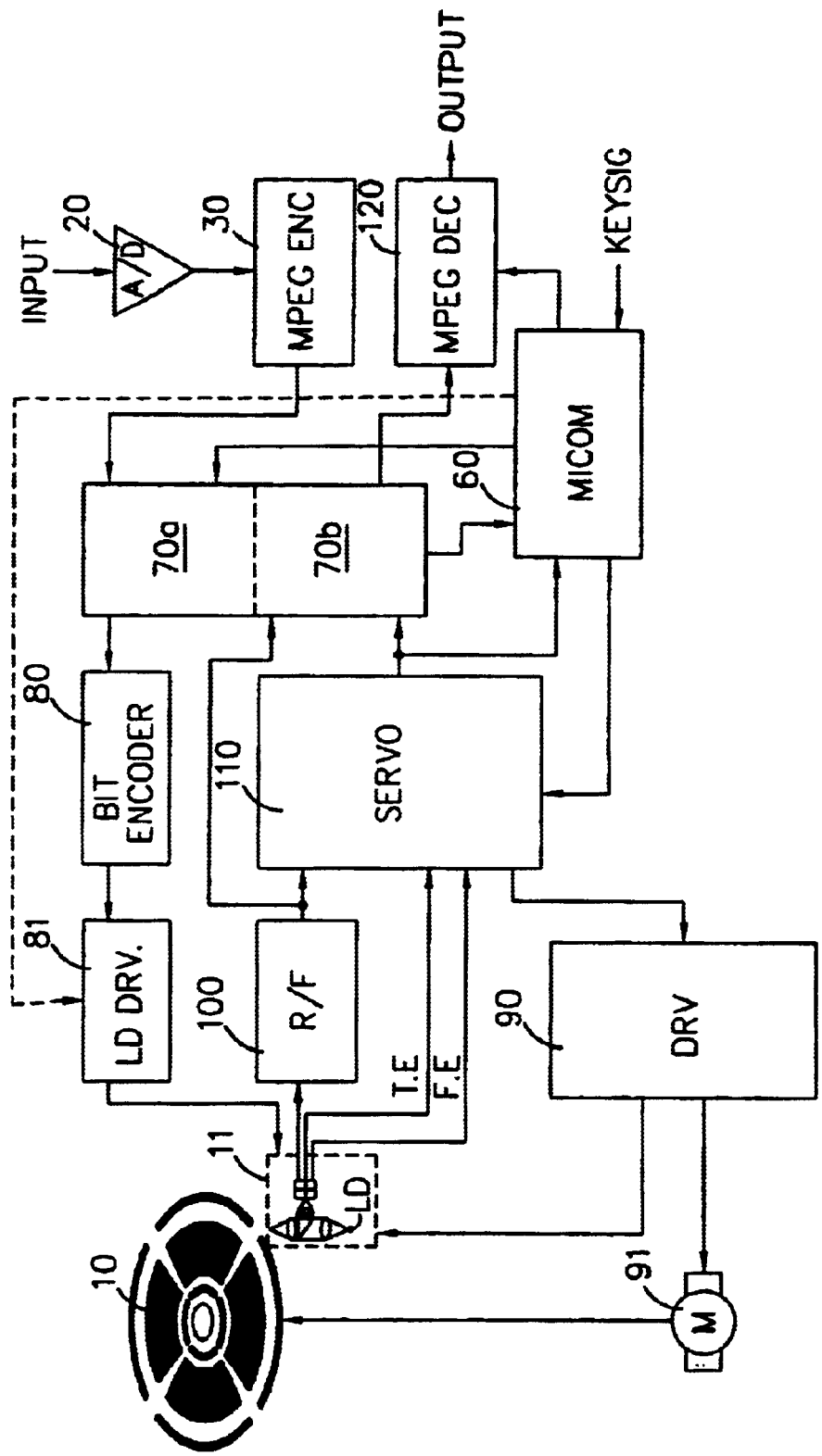
FIG. 1 is a schematic block diagram illustrating the construction of a conventional writable optical storage medium recording/reproducing apparatus.
Figure 2:
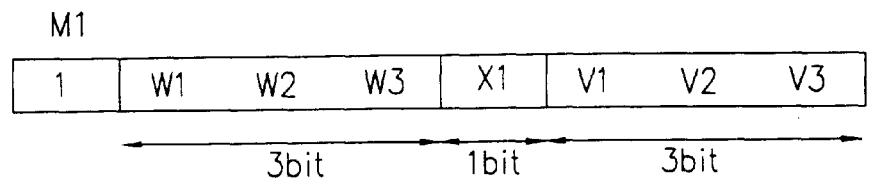
FIG. 2 is a view illustrating a data format of a light power value written in a writable optical storage medium in the conventional art.
Figure 3:
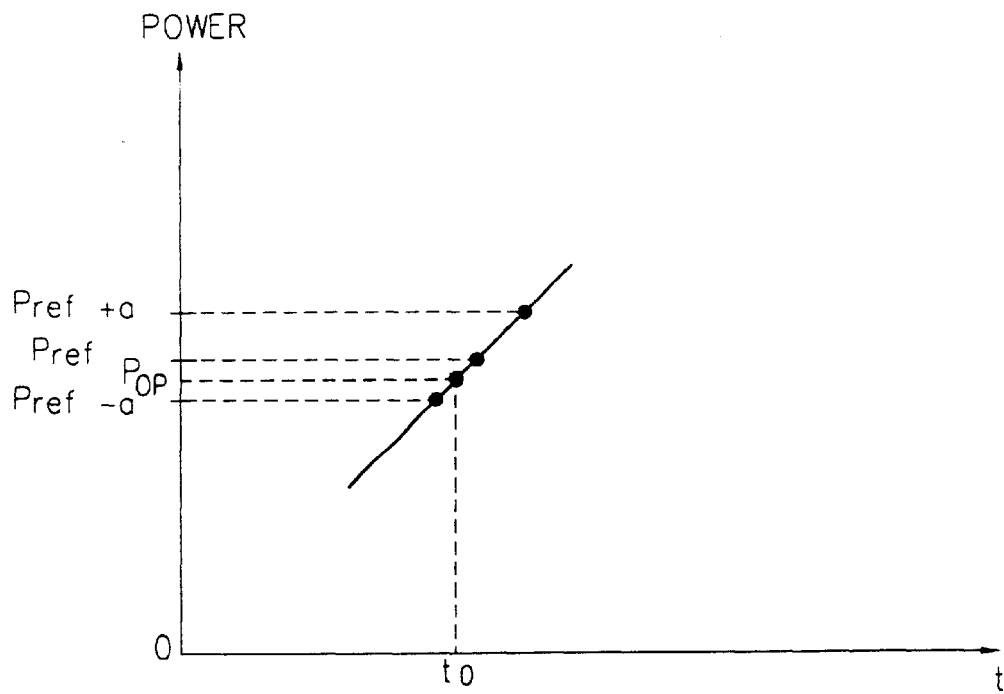
FIG. 3 is a graph illustrating a process for changing a light power based on a reference writing light power value when writing a test digital data to detect an optimum writing light power.
Figure 4A:
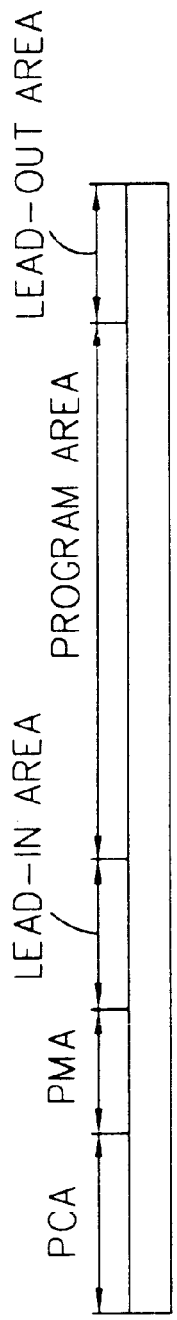
FIG. 4A is a view illustrating a writing signal test region formed on a disk for an optimum writing light power detection.
Figure 4B:
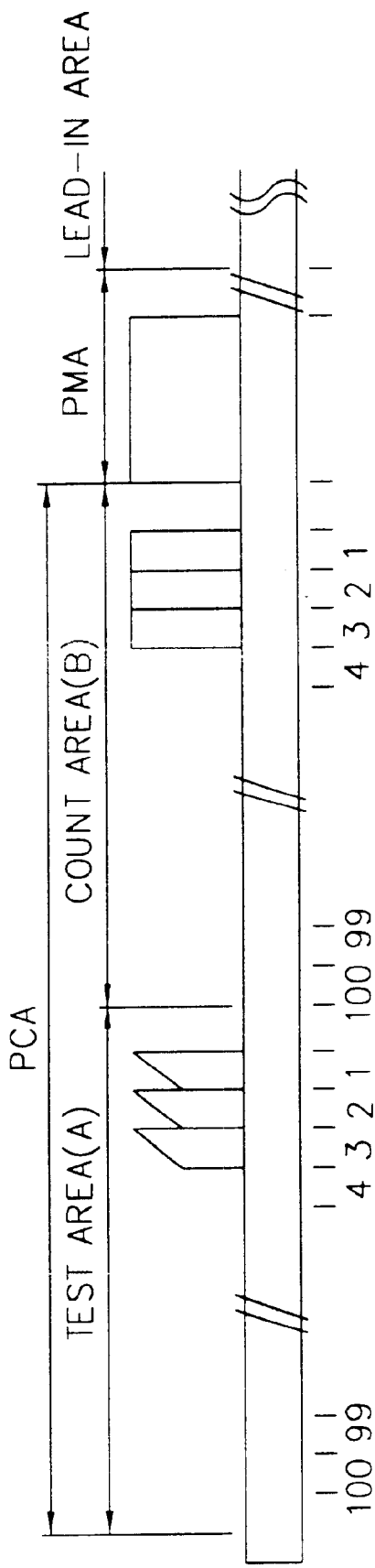
FIG. 4B is a view illustrating a PCA region.
Figure 5:
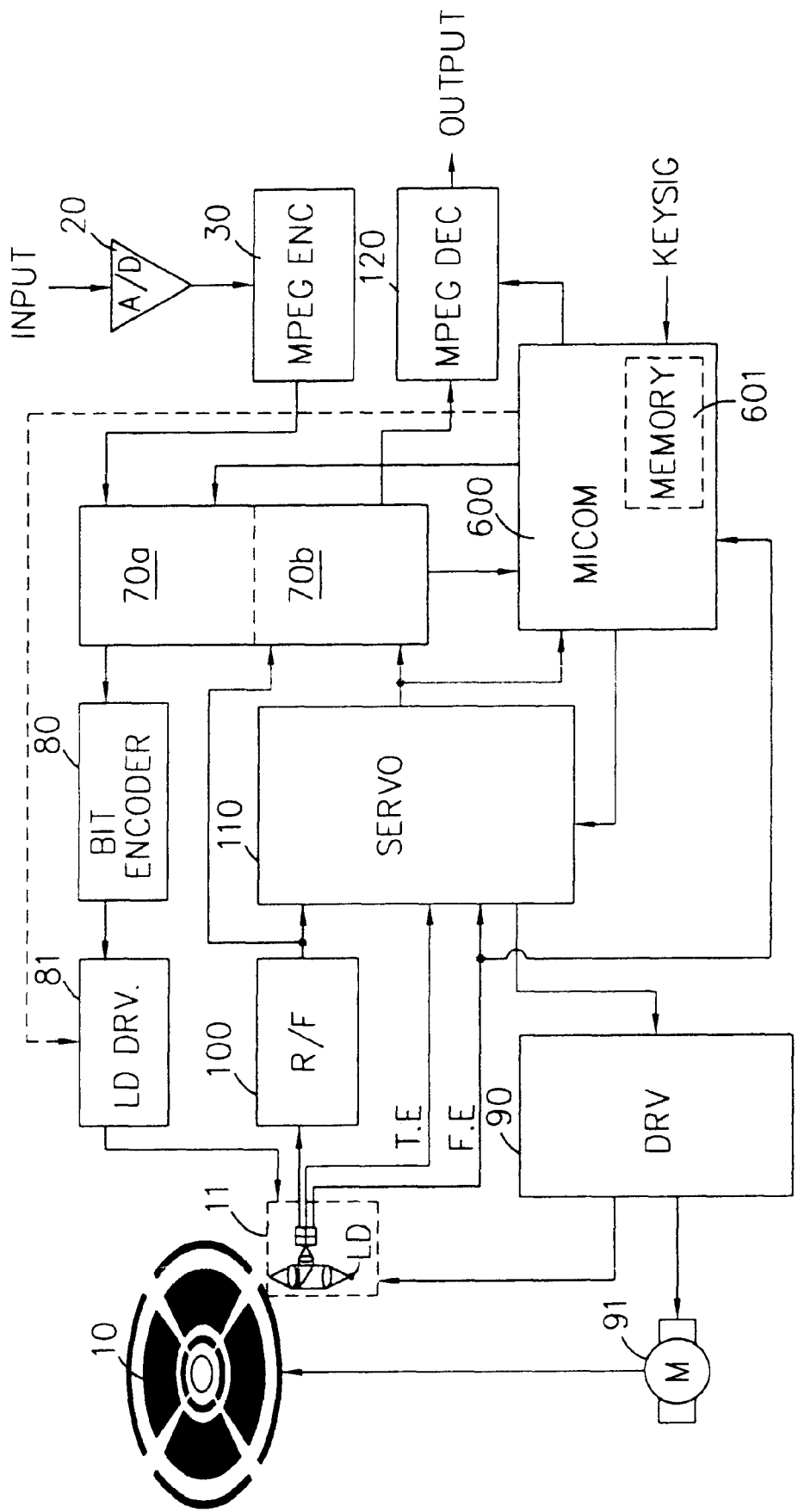
FIG. 5 is a schematic block diagram illustrating the construction of an writable optical storage medium recording/reproducing apparatus according to the present invention.

FIG. 5 illustrates a writable optical storage medium recording/reproducing apparatus according to the present invention which has the same construction as the conventional recording/reproducing apparatus of FIG. 1 except for a microcomputer 600 connected with a memory 601 storing a plurality of manufacturer company information of the writable optical storage media and the optimum writing condition in corresponding with the manufacturer of each writable optical storage medium.

The writable optical storage medium recording/reproducing apparatus according to the preferred embodiment of the present invention reads certain information of the writable optical storage medium from a certain region of a certain writable medium, judges a manufacturer of the writable medium, determines an optimum writing condition corresponding to the thusly judged manufacturer from an memory 601 and searches an optimum writing light power based on the thusly judged optimum writing condition.

The operation of the writable optical storage medium recording/reproducing apparatus according to the present invention will be explained with reference to the accompanying drawings.

Figure 6:
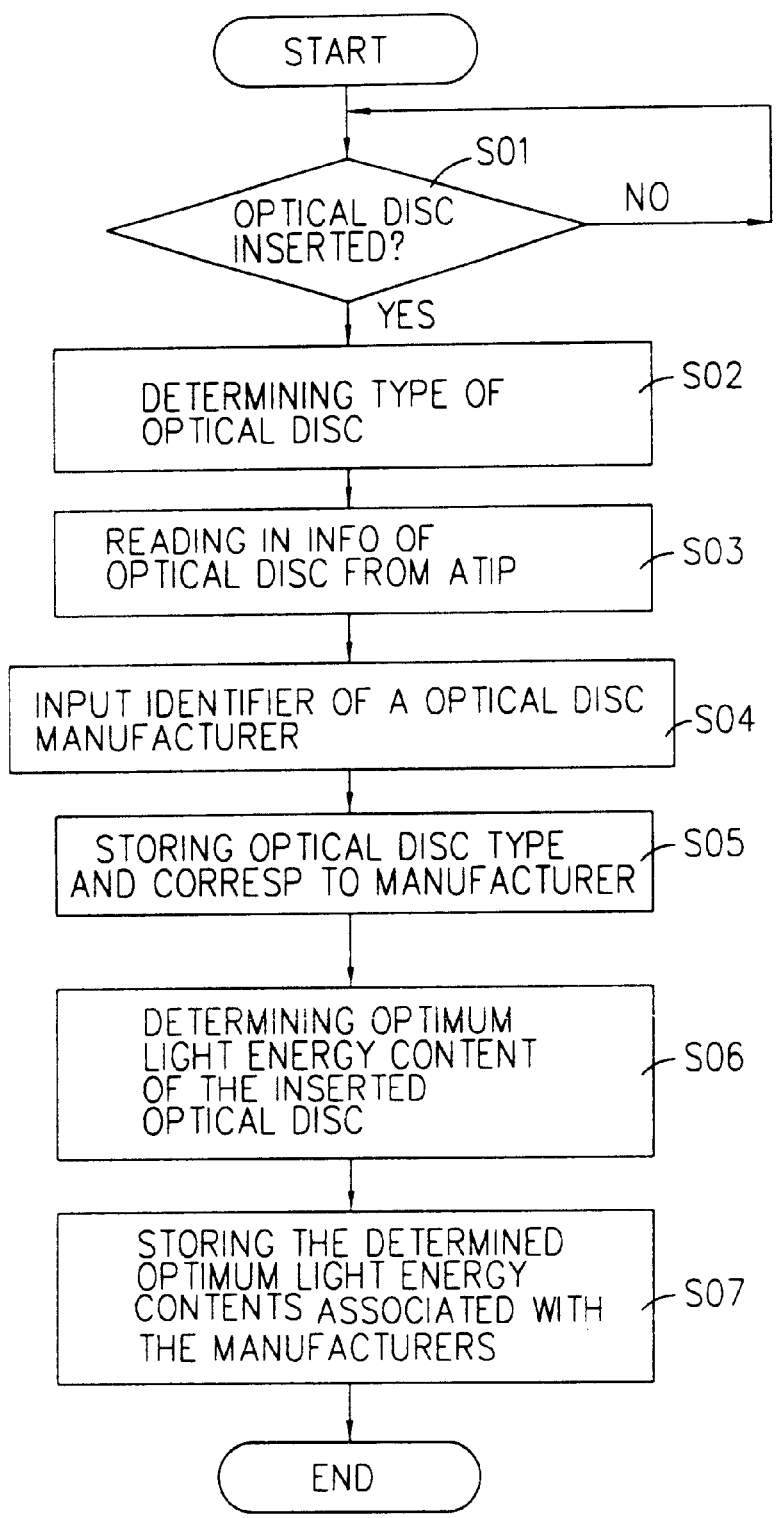
FIG. 6 is a flow chart illustrating an optimum writing condition detecting and storing method for an writable optical storage medium according to the present invention.

FIG. 6 is a flow chart which illustrates the steps of an optimum writing condition detection and stores the optimum writing condition to a certain memory 601. When a writable optical storage medium 10 is inserted into a optical storage medium recording/reproducing apparatus in Step S01, the microcomputer 600 judges the type of writable optical storage medium (for example, CD-R or CD-RW) from a focusing error signal FE detected when the pick-up unit 11 accesses the writable optical storage medium 10 by controlling the servo unit 110 and the drive unit 90 in Step S02.

Next, a certain information data which is different depending on the manufacturer of the writable optical storage medium 10 is read from the writable optical storage medium 10 in Step S03. The information data which is different depending on the manufacturer is judged by reading the pre-recorded lead-in time from the writable optical storage medium 10 in the case of a CD-R and by reading the pre-recorded lead-out time in the case of a CD-RW. Here, the information data is stored in a time data format of Minutes, Seconds and Frames in the sub-Q information field of the lead-in region of or lead-out region in the writable optical storage medium 10, in the case that the writable optical storage medium 10 is a recordable medium(for example, a CD-RW, a CD-R, etc.) as shown in FIGS. 8A and 8B.

When the pick-up unit 11 reads the written time data and outputs a high frequency signal to the digital reproducing signal processing unit 70b, the digital reproducing signal processing unit 70b converts the high frequency signal into a digital data and performs an Eight to Fourteen Modulation (EFM) and ECC decoding operation and transmits a result of the EFM modulation and ECC decoding operation to the microcomputer 600. The microcomputer 600 detects an identification code (for example, a code indicating the medium manufacturer, etc.) from the time data obtained during the decoding process in Step S04 and temporarily stores the identification character in Step S05.

Next, the microcomputer 600 controls the LD driving unit 81 so that the light energy content (writing power level and write strategy) gradually is changed and the test digital data is written into a certain region of the writable optical storage medium. Thereafter, the microcomputer 600 detects an optimum light energy content (or optimum writing condition) having a good reproducing characteristic and stores the detected optimum light energy content into a memory 601.

The above-described operation is performed with respect to the writable optical storage medium of the different medium manufacturers, and the optimum light energy content (or the optimum writing condition) is detected in Step S06. As shown in the following Tables 1 and 2, the detected optimum light energy content (or optimum writing condition) is stored into a certain storing unit in accordance with the manufacturers of the writable medium in Step S07.

TABLE 1

| | In the case of a CD-R (1× speed) | | |
|---|---|---|---|
| Manufacturer | Lead-in start time | W1W2W3 | Optimum light energy content (power level [mW]) |
| Kodak | 97:27:45 | 110 | 6.0 |
| Mitsui | 97:27:55 | 100 | 5.6 |
| Ricoh(A) | 97:27:66 | 101 | 5.8 |
| Anix | 97:23:10 | 100 | 6.0 |
| Ritex | 97:31:00 | 110 | 6.6 |
| Mitsubishi | 97:34:20 | 110 | 6.6 |
| Woong Jin | 97:28:21 | 111 | 6.8 |
| TDK | 97:32:00 | 110 | 6.8 |
| CMC | 97:26:60 | 101 | 6.2 |
| SMC | 97:15:00 | 100 | 5.8 |
| Maxwel | 97:25:21 | 111 | 6.8 |
| Ricoh(B) | 97:27:00 | 101 | 6.6 |
| BTC | 97:22:18 | 110 | 6.8 |
| Pioneer | 97:27:25 | 111 | 7.0 |
| SKC | 97:26:23 | 100 | 5.8 |
| Taiyo Yuden | 97:24:01 | 101 | 6.0 |

TABLE 2

In the case of a CD-RW (2× speed)

| Manufacturer | Lead-out start time | W1W2W3 | Optimum light energy content (power level [mW]) |
|---|---|---|---|
| MCC | 74:30:00 | 100 | 12.4 |
| Ricoh | 74:12:00 | 101 | 12.6 |
| Ritex | 74:45:00 | 010 | 12.2 |

The thusly stored information is used as an information with respect to the optimum light energy content (or optimum writing condition) of the writable optical storage medium when manufacturing the recording/reproducing apparatus for a writable optical storage medium and is stored into the storing unit of the recording/reproducing apparatus.

Here, table 1 illustrates the manufacturers of the writable optical storage medium (CD-R) based on 1× speed and the time data corresponding thereto, and Table 2 illustrates the manufacturers of the rewritable optical storage medium (CD-RW) based on 2× speed and the time data corresponding thereto. In the present invention, the data of Tables 1 and 2 include the optimum light energy contents, especially power level.

Figure 7:
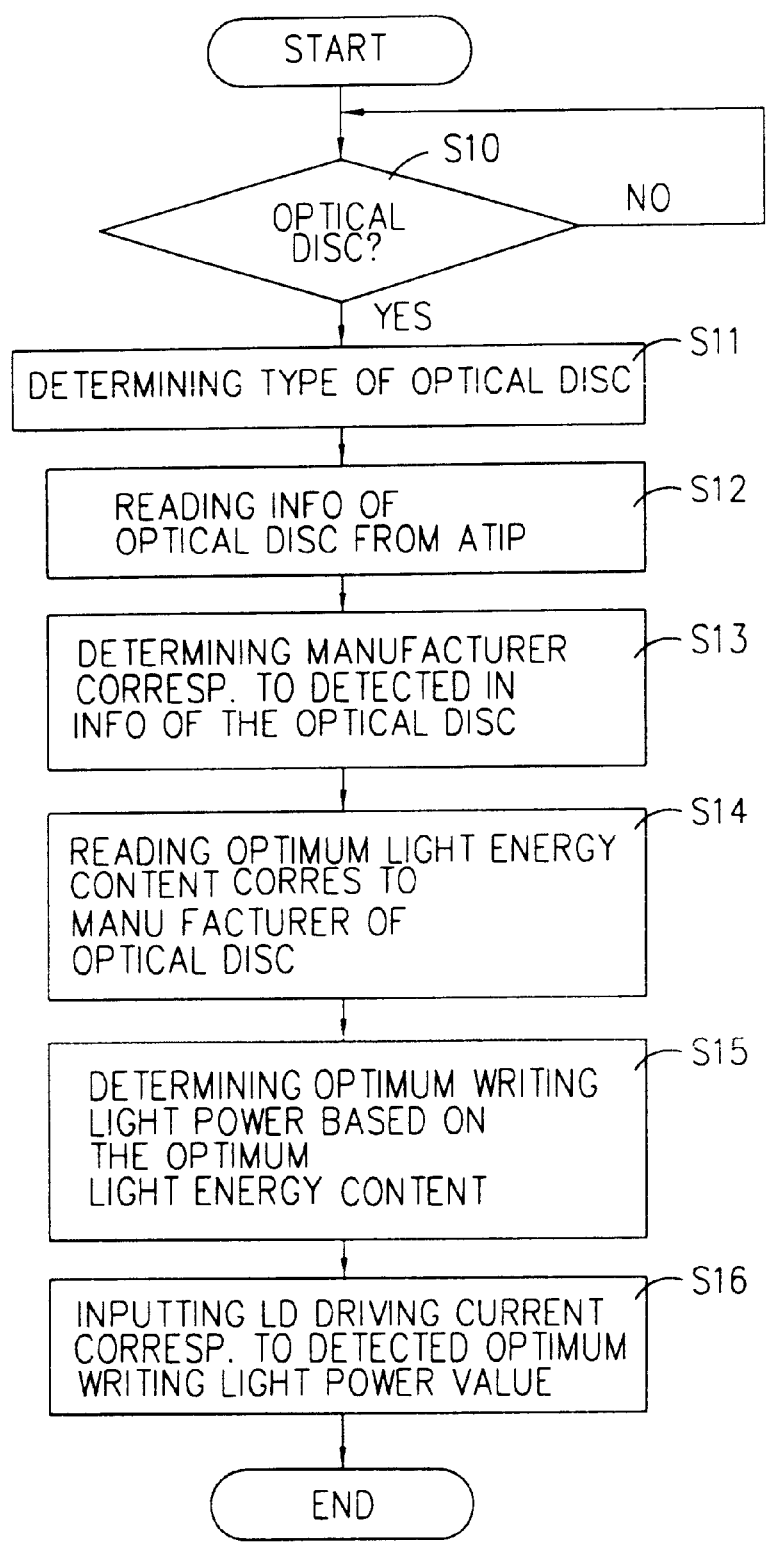
FIG. 7 is a flow chart illustrating a writing light power adjusting method for an writable optical storage medium based on the optimum writing condition according to the present invention.

FIG. 7 illustrates an optimum light energy content adjusting method for a writable optical storage medium according to one embodiment of the present invention. The microcomputer 600 receives a FE signal from the pick-up unit 11 and judges whether a writable optical storage medium is loaded in the writable optical storage recording/reproducing apparatus in Step S10. If it is loaded, the microcomputer 600 receives a signal outputted R/F unit 100 and determines the type of the writable optical storage medium in Step S11.

Next, the microcomputer 600 controls the servo unit 110 and the drive unit 81, and the pick-up unit 11 reads out the time data corresponding to a certain information of the writable optical storage medium written in a certain region of the writable optical storage medium, so that it is possible to recognize the time data by the manufacturer from the signals recovered by the digital reproducing signal processing unit 70b. The microcomputer 600 searches the time data by the manufacturer of the optical storage medium stored in the memory 601 in the formats as shown in Tables 1 or 2 generated based on the processes of FIG. 6 and judges the manufacturer of the writable optical storage medium in Step S13.

After the manufacturer of the inserted writable optical storage medium 10 is judged, the optimum light energy content (or optimum writing condition) is read out from the memory 601 in Step S14.

The microcomputer 600 performs an optimum writing light power detection process by varing the writing light power according to an increment of a energy content based on the optimum writing energy content (or optimum writing condition) as a reference start point in Step S15 and detects an optimum writing light power of the writable optical storage medium.

After the optimum writing light power is obtained irrespective of a characteristic deviation of the writable optical storage medium in accordance with the manufacturer of the writable optical storage medium, the microcomputer 600 applies a control signal corresponding to the optimum writing light power to the LD driving unit 81 and applies a driving current corresponding thereto to the pick-up unit 11 via the LD driving unit 81 in Step S16.

The input signal converted by the A/D converter 20 is encoded into a MPEG format by the MPEG encoder 30 and is changed to a corresponding bit stream format by the digital signal processing unit 70a and the channel bit encoder 80. Thereafter, the bit stream data is written into a user's data recording region of the writable optical storage medium 10 by the pick-up unit 11.

As described above, in the optimum writing condition detection and storing method in accordance with the manufacturer of the writable optical storage medium and a writing light power detection adjusting apparatus using the same and a method thereof according to a preferred embodiment of the present invention, the manufacturer of the writable medium and an optimum writing condition of a writable medium corresponding to the manufacturer are detected and stored in a memory of the writable optical medium recording/reproducing apparatus. When writing an input signal into the writable optical storage medium, the manufacturer of the writable optical storage medium inserted in the writable optical storage medium recording/reproducing apparatus is judged by the microcomputer. The optimum writing condition is detected based on the manufacturer of the writable optical storage medium, and the optimum writing light power is obtained based on the optimum writing condition, and an input signal is recorded in the program region of the writable optical storage medium based on the optimum writing light power. Therefore, in the present invention, it is possible to write an input signal into an writable optical storage medium irrespective of the manufacturer of the writable optical storage medium by preventing a non-detection phenomenon of the optimum writing light due to a characteristic deviation of the writable optical storage medium according to the manufacturer of the writable optical storage medium, and it is possible to reproduce the recorded signals from the user's data recording region of the writable optical storage medium without an error.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A method of establishing optimum test writing parameters for test writing of a writable optical storage media, which optimum test writing parameters are specific to both an optical storage media recording/reproducing apparatus and to a writable optical storage medium manufactured by a respective one of a plurality of media manufacturers and which optimum test writing parameters are established independently of and without being constrained by default test-writing reference power parameters pre-recorded in the writable optical storage media during its manufacture, the method comprising:

detecting information pre-recorded in a writable optical storage medium during its manufacture which uniquely specifies the writable optical storage medium's respective manufacturer, the information being detected from time information of a lead-in area or lead-out area recorded on the writable optical storage medium during manufacturing of the writable optical storage medium, the time information differs by each respective media manufacturer of the plurality of media manufacturers and thereby represents an identification code which uniquely identifies the respective manufacturer of the writable optical storage medium;

performing a test writing parameter optimization on the writable optical storage medium to determine optimized test writing parameters for the writable optical storage medium, by writing test digital data to the writable optical storage medium while changing a light energy content, the light energy content being the writing power level and write strategy employed by the recording/reproducing apparatus when writing the test digital data to the writable optical storage medium;

reproducing the written test digital data from the writable optical storage medium and, in accordance with said reproduction, determining an optimum test writing light energy content representing optimum test writing parameters having a reproducing characteristic specific to both the writable optical storage medium and the recording/reproducing apparatus, the determined writable optical storage medium and recording/reproducing apparatus specific optimum test writing parameters being thereby established with specificity to the recording/reproducing apparatus employed and separately of default test-writing parameters pre-recorded in the writable optical storage media during its manufacture; and storing the determined optimum test writing parameters specific to both the writable optical storage medium and the recording/reproducing apparatus in a memory of the recording/reproducing apparatus in association with the information specifying the respective manufacturer of the writable optical storage medium.

2. The method of claim 1, further comprising:

determining optimum test writing parameters specific to the recording/reproducing apparatus for a plurality of writable optical storage media manufactured by different respective manufacturers of the plurality of manufacturers, each manufacturer identified uniquely by respective time information pre-recorded in the media during its manufacture, for establishing a plurality of manufacturer-specific optimum test writing parameters specific to the recording/reproducing apparatus and corresponding to each respective manufacturer's writable optical storage medium.

3. The method of claim 2, further comprising:

storing the established manufacture-specific optimum test writing parameters corresponding to each respective manufacturer's writable optical storage medium in a memory of a recording/reproducing apparatus in association with the information detected from each writable optical storage medium uniquely specifying the respective manufacturer thereof.

4. A method of establishing manufacturer-specific optimum test writing parameters for writing of a writable optical storage medium with specificity to a recording/reproducing apparatus, comprising:

detecting information contained in a writable optical storage medium which uniquely specifies the writable optical storage medium's respective manufacturer, the information being pre-recorded during manufacture of the writable optical storage medium as a time information of a lead-in area or lead-out area on the writable optical storage medium which time information is different depending on the respective manufacturer of the writable optical storage medium and which thereby uniquely specifies the respective manufacturer of the writable optical storage medium; and setting pre-determined manufacturer-specific optimum test writing parameters corresponding to the detected information specifying the respective manufacturer of the writable optical storage medium, the manufacturer-specific optimum test writing parameters having been previously determined with specificity to the recording/reproducing apparatus through a test writing parameter optimization performed with such a recording/reproducing apparatus upon-writable optical storage media manufactured by the respectively identified manufacturer and independently of and without being constrained to default test writing reference power parameters pre-recorded in the writable optical storage medium during its manufacture.

5. The method of claim 4, further comprising:

performing a writing parameter optimization on the writable optical storage medium, to determine optimized writing parameters for writing to the writable optical storage medium, by test writing to the writable optical storage medium using the set optimum test writing parameters.

6. The method of claim 4, further comprising:

determining optimum test writing parameters for writable optical storage media manufactured by a plurality of different manufacturers, for establishing manufacturer-specific optimum test writing parameters corresponding to each respective manufacturer's writable optical storage medium.

7. The method of claims further comprising:

associating the established manufacturer-specific optimum test writing parameters corresponding to each respective manufacturer's writable optical storage medium with an information contained in a writable optical storage medium uniquely specifying the respective manufacturer thereof.

8. A method of establishing optimum writing parameters for writing of a writable optical storage medium specific to both the writable optical storage medium and a recording/reproducing apparatus, comprising:

detecting information recorded on a writable optical storage medium specifying the respective manufacturer of the writable optical storage medium, the information being pre-recorded as a time information of a lead-in area or lead-out area on the writable optical storage medium which time information differs by each manufacturer and thereby uniquely identifies the manufacturer of the writable optical storage medium;

setting previously established optimum test writing parameters corresponding to the detected information, the optimum test writing parameters having been previously determined-with specificity to a recording/reproducing apparatus through a test writing parameter optimization procedure performed with such a recording/reproducing apparatus upon writable optical storage media manufactured by the respectively identified manufacturer and independently of and without being constrained by default test writing reference power parameters pre-recorded in the writable optical storage medium during its manufacture, for test writing of the writable optical storage medium; and performing a write parameter optimization on the writable optical storage medium using the previously established optimum test writing parameters to determine optimum writing parameters for writing of the writable optical storage medium.

9. The method of claim 8, further comprising:

determining optimum test writing parameters for writable optical storage media manufactured by a plurality of different respective manufacturers for establishing the manufacturer-specific optimum test writing parameters corresponding to each manufacturer.

10. An apparatus for establishing optimum writing parameters for writing of a writable optical storage medium, comprising:
- an optical pickup capable of detecting information contained in a writable optical storage medium uniquely specifying the respective manufacturer of the writable optical storage medium, the information being recorded as a time information of a lead-in or lead-out area on the writable optical storage medium which time information differs by each manufacturer and thereby uniquely identifies the manufacturer of the writable optical storage medium;
- a memory storing therein a plurality of pre-determined manufacture-specific optimum test writing parameters corresponding to writable optical storage media manufactured by a plurality of different respective manufacturers and also storing in association therewith information uniquely specifying the manufacturer of each writable optical storage medium corresponding to such optimum test writing parameters, the manufacturer-specific optimum test writing parameters having been previously determined with specificity to such an apparatus through a test writing parameter optimization performed with such an apparatus upon writable optical storage media manufactured by the respectively identified manufacturer and independently of and without being constrained by default test writing reference power parameters pre-recorded in the writable optical storage medium during its manufacture; and
- a controller, operatively coupled with each of the optical pickup and the memory controlling the optical pickup to detect from the writable optical storage media the information contained therein uniquely specifying the manufacturer of the writable optical storage medium, and controlling the optical pickup for performing a writing parameter optimization on the writable optical storage media to determine optimum writing parameters for writing of the optical storage medium by test writing to the writable optical storage medium using the stored previously established manufacturer-specific optimum test writing parameters corresponding to the detected information.

11. An apparatus for establishing manufacturer-specific optimum writing parameters for writing of a writable optical storage medium, comprising:
- storage means for storing pre-determined manufacturer-specific optimum test writing parameters respectively corresponding to writable optical storage medium manufactured by a plurality of different manufacturers, the pre-determined optimum test writing parameters for each respective writable optical storage medium being stored together with associated identification information uniquely identifying the corresponding manufacturer thereof, the identification information being represented as a time information pre-recorded as a time information of a lead-in area or lead-out area on the writable optical storage medium during manufacture of the writable optical storage medium and differing by each manufacturer for thereby uniquely identifying the manufacturer of the writable optical storage medium, the manufacturer-specific optimum test writing parameters having been previously determined with specificity to such apparatus through a test writing parameter optimization procedure performed with such an apparatus upon writable optical storage media manufactured by the respectively identified manufacturer and independently of and not constrained by default test writing reference power parameters pre-recorded in the writable optical storage medium during its manufacture;
- detection means for detecting the pre-recorded time information contained in the writable optical storage medium which uniquely specifies the respective manufacturer thereof; and
- controller means for performing a write parameter optimization on the writable optical storage medium by test writing to the writable optical storage medium using the stored pre-determined manufacturer-specific optimum test writing parameters corresponding to the detected information specifying the respective manufacturer of the writable optical storage medium.

12. The apparatus of claim 11, wherein the time information contained in the writable optical storage medium is indicated in units of Minutes, Seconds and Frames.

\* \* \* \* \*